E. TALLMAN.
VEHICLE TIRE.
APPLICATION FILED APR. 28, 1911.
1,010,980.
Patented Dec. 5, 1911.
2 SHEETS—SHEET 1.
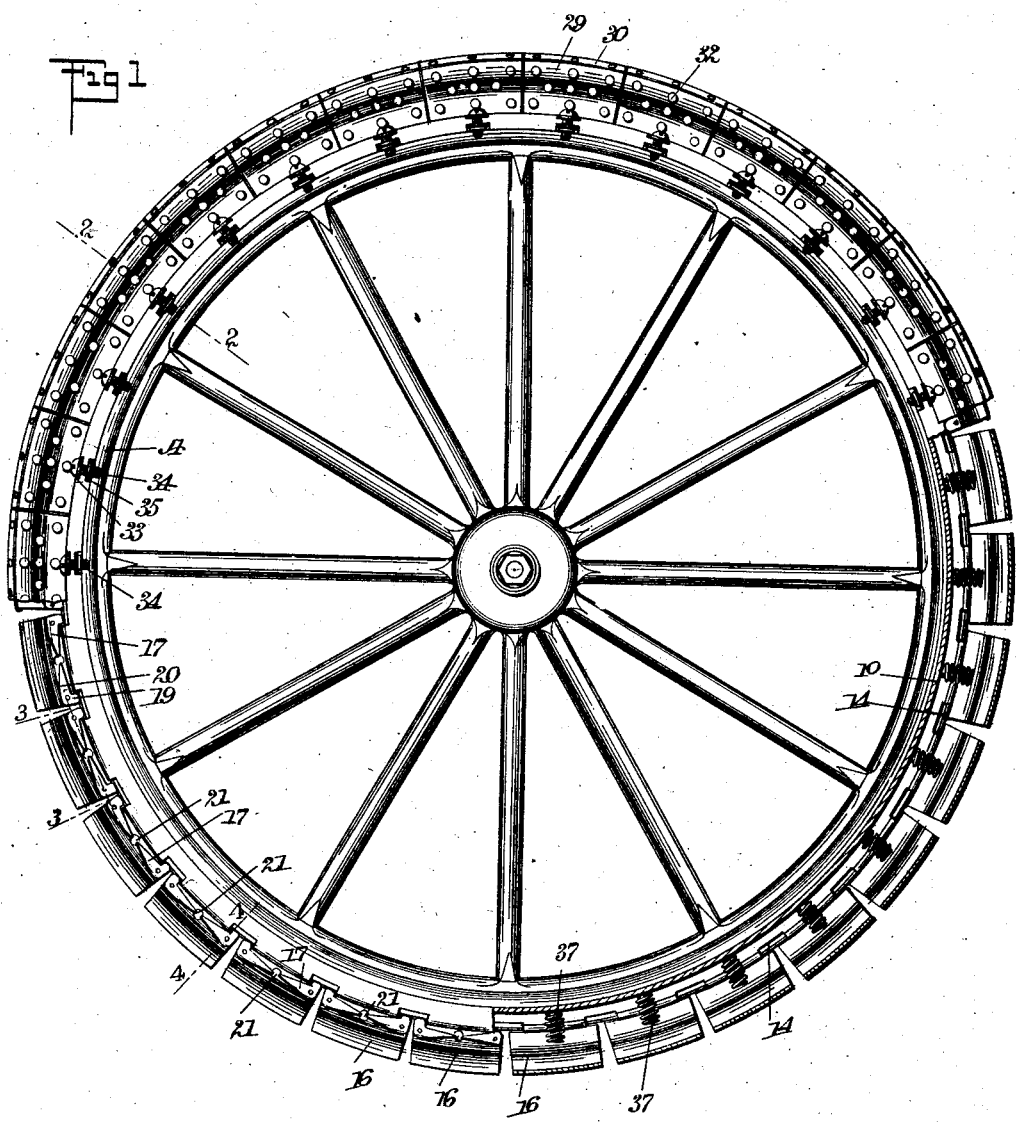
WITNESSES
INVENTOR
Ellsworth Tallman
BY
ATTORNEYS

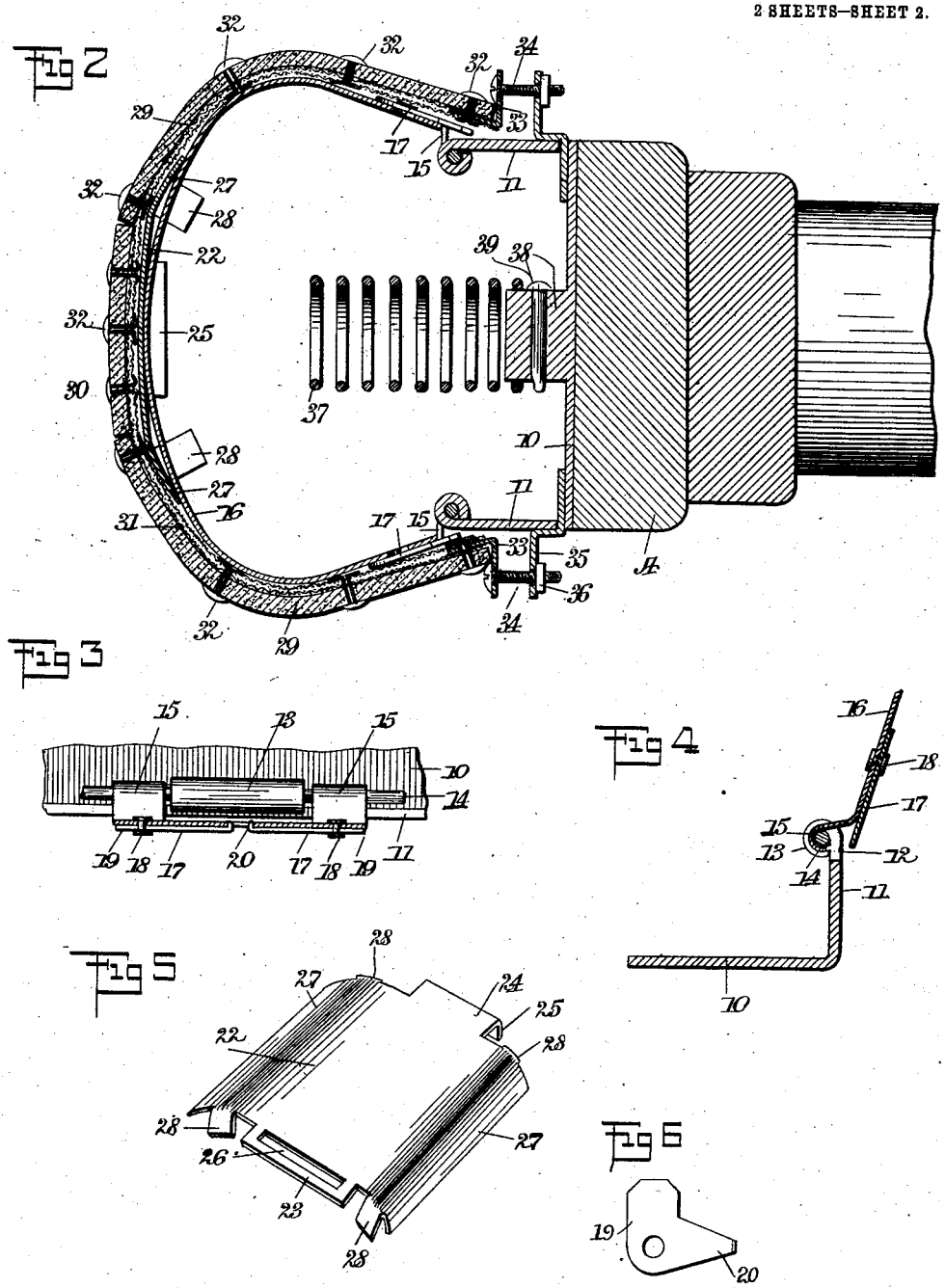

UNITED STATES PATENT OFFICE.

ELLSWORTH TALLMAN, OF MORLEY, IOWA.

VEHICLE-TIRE.

1,010,980.   Specification of Letters Patent.   Patented Dec. 5, 1911.

Application filed April 28, 1911. Serial No. 623,855.

*To all whom it may concern:*

Be it known that I, ELLSWORTH TALLMAN, a citizen of the United States, and a resident of Morley, in the county of Jones and State of Iowa, have invented a new and Improved Vehicle-Tire, of which the following is a full, clear, and exact description.

Among the principal objects which the present invention has in view are: to provide a resilient tire for a vehicle wheel constructed from spring metal to avoid the disadvantages in the employment of rubber tubes of usual construction; to provide a tire of the character mentioned constructed from a series of sectional forms where the said forms are each detachable and replaceable; to provide an articulated tire constructed from metallic sectional springs, each of the springs being coöperatively connected with adjacent springs to unify the action of the springs; to provide a tire of the character mentioned with stop members arranged to reinforce the tire structure to avoid the breakage of single sectional springs when subjected to sudden and unusual strains; and to provide for a tire of the character mentioned a wearing shoe constructed from a series of assembled short removable sections.

One embodiment of the present invention is disclosed in the structure illustrated in the accompanying drawings, in which like characters of reference denote corresponding parts in all the views, and in which—

Figure 1 is a side view of a vehicle wheel provided with a tire constructed and arranged in accordance with the present invention; Fig. 2 is a cross section of the same, on an enlarged scale, the section being taken on the line 2—2 in Fig. 1; Fig. 3 is a detail view in section, and on an enlarged scale, the section being taken on the line 3—3 in Fig. 1; Fig. 4 is a detail view, on an enlarged scale and in section, the section being taken on the line 4—4 in Fig. 1; Fig. 5 is a detail view in perspective showing one of the articulated tread forming plates; and Fig. 6 is a detail view, on an enlarged scale, of one of the latches for securing the sectional springs in position.

As shown in the accompanying drawings, a wheel which is provided with the felly A, has mounted thereon a channel rim 10. The rim 10 is preferably constructed from plate metal to form the side extended flanges 11.

The flanges 11 are cut away at intervals to form extensions 12, the ends 13 whereof are adapted to be curled over the rods 14, as seen best in Figs. 2 and 4 of the drawings. The rods 14 where they bridge the spaces between the extensions 12 operate as the ordinary clencher wire used in certain forms of tires when engaged by the overturned hook ends 15 of the sectional springs 16. Any suitable means for securing the rim 10 to the felly A may be employed.

The tire is primarily constructed from a plurality or series of U-shaped sectional springs 16. The springs 16 are constructed from any suitable metal, and are set so that when the hook ends 15 thereof are contracted toward each other, as shown in Fig. 2, they assume the form therein shown under tension. The springs 16 are engaged with the rods 14 by contracting the hook ends 15 to pass between the oppositely disposed rods so that when released the expansion of the said springs is outward to engage the said rods 14, as shown in Fig. 2 of the drawings.

Each of the sectional springs 16, as shown best in Fig. 1 of the drawings, is provided adjacent each end thereof with two pivoted latches 17. The latches 17 are pivotally secured upon the springs 16 by means of rivet pivots 18. The latches 17 are provided with a head 19 and a tail piece 20, the end of the tail piece being, as shown in Fig. 6, pinched out to form a section which may be readily turned within the perforations 21 formed in the said springs 16. The object in this construction is to lock in position the latches 17. When so locked the heads 19 of the latches, as seen best in Fig. 4, extend over the opening of the hook ends 15 to close the same and to prevent the rods 14 from passing out of engagement with the said hook ends.

When building the tire upon the wheel the springs 16 are each separately locked in position upon the rods 14 in the manner above described. It will then be found, as seen in Fig. 1 of the drawings and at the left hand lower side thereof, that a series of closely related U-shaped sectional springs 16 are disposed about the entire circumference of the wheel but unconnected at their outer or tread areas. It will also be seen that each of these springs is, by means of the latches 17, held removable from the rim 10 and the flange 11 thereof. In this position it is evident each of the springs would have an entirely independent action. It is to secure mutual operation between the adjacent springs and to strengthen the tire construction that I have provided a metal tread belt formed from the articulated plates 22.

The plates 22, as shown in Fig. 5, are provided at one end with a slotted loop 23 and at the opposite end with a hook extension 24. The upturned portion of the extension 24 on each of the said plates is turned toward the hub of the wheel and extended through the elongated slot 26 formed in the loop of the adjacent plate. This construction forms from the plates 22 an endless belt which extends about the wheel and covers the tread section of the springs 16. The belt so formed is of slightly less circumference than is formed by the uncontracted sectional springs 16. To place the belt so formed in position the various springs are slightly contracted to flatten the tread area of each of the springs. The outward pressure thus exerted on the belt formed by the plates 22 is sufficient to maintain the said belt taut under all conditions of operation.

To assist in centering the belt formed by the plates 22, and to provide a flattened wearing tread for the wheel, the body of the plate is somewhat flattened, as shown in Fig. 5, and has extended from the lateral edges thereof the flared side bends 27. From the bends 27, and at both ends thereof, are turned in the tabs 28 which, when the plates are adjusted, extend to each side of the springs 16 to maintain the operative position thereof.

It is to provide a frictional wearing surface for the wheel that I form a shoe as shown in the drawings. The shoe in its preferred form consists of three separate leather sections which are each securely mounted upon a heavy canvas backing 31. Each of the springs 16 is separately provided with the shoe, which, like the said springs, employs a large number of small sections to form the completed tire shoe. The side sections 29 may be formed of a somewhat inferior quality of leather; the middle or tread section 30 is formed of a superior quality of leather, affording a greater resistance to the abrasive wear of the road bed. In all instances, however, the leather is reinforced by studs 32 which are interspersed at intervals and placed with reference to saving the leather from wear. At the ends of the shoe strips are secured the leather fastening tabs 33, which tabs are suitably pierced for the passage of screw bolts 34. It is to receive the screw bolts 34 that the rim 10 is provided with a suitable number of oppositely disposed brackets 35. The brackets 35 are suitably mounted upon the rim 10. The nuts 36 are set up on the bolts 34 substantially as shown in Fig. 2 of the drawings, and as the same are tightened it will be seen the strain of the shoe sections is exerted upon the springs 16 and the plates 22. When in the course of time one or more of the shoe sections thus constructed and mounted become worn they may be easily removed by releasing the bolts 34 and removing the section for repair or replacement.

In Fig. 2 is best shown a buffer spring 37. The buffer springs 37 are suitably mounted to be firmly held upon the bosses 38 set out from the body of the rim 10. To hold the springs upon the bosses 38 a perforation is formed in the said bosses, and a section of one of the ends of the spring 37 is bent sharply to the diameter of the said spring and inserted through the perforation in the boss. Where desired or found necessary the end of the spring so inserted is headed over to form the head 39. The length of the springs 37 is optional. It is preferred by me that they shall not normally extend to meet the inner surface of the springs 16. The strength of the springs 37 it will be understood may be varied according as the needs of the use to which the wheel is to be placed require.

In the manufacture of the tire there is placed on the rim 10 one spring 37 for each of the sectional springs 16. In this manner there is guarded against the action whereby any one spring section might yield to a point dangerous to the construction of the said spring.

With a wheel thus constructed it will be found that the ride of the wheel is relatively as soft or easy as that of a pneumatic tire. The strength and durability of the wheel will be recognized without comment.

Having thus described my invention, what I claim as new and desire to secure by Letters Patent is:—

1. A vehicle tire, having a rim provided with a plurality of hinge pin sections; a plurality of juxtaposed U-shaped metal spring members, said members being provided with hook shaped ends adapted to engage said hinge pin sections; and a plurality of latches for locking said hinge pin sections within said hook shaped ends.

2. A vehicle tire, having a rim provided with a plurality of hinge pin sections; a plurality of juxtaposed U-shaped metal spring sections, said members being provided with hook shaped ends adapted to engage said hinge pin sections; a plurality of latches for locking said hinge pin sections within said hook shaped ends; and means for locking said latches to prevent the movement thereof to release said hinge pin sections.

3. A vehicle tire of the character described having a plurality of juxtaposed U-shaped metal spring members; and an endless belt embodying a plurality of pivotally connected flattened plates the lateral edges of said plates being shaped to form side bends turned toward the center of said tire to bear on the said spring members, said plates having tabs bent to engage the said spring members to preserve the relation thereof to said belt.

In testimony whereof I have signed my name to this specification in the presence of two subscribing witnesses.

ELLSWORTH TALLMAN.

Witnesses:
B. L. STINGLEY,
E. V. MILLER.

Copies of this patent may be obtained for five cents each, by addressing the "Commissioner of Patents, Washington, D. C."